(No Model.) 2 Sheets—Sheet 1.
C. H. BELLAMY.
BICYCLE.
No. 576,538. Patented Feb. 9, 1897.
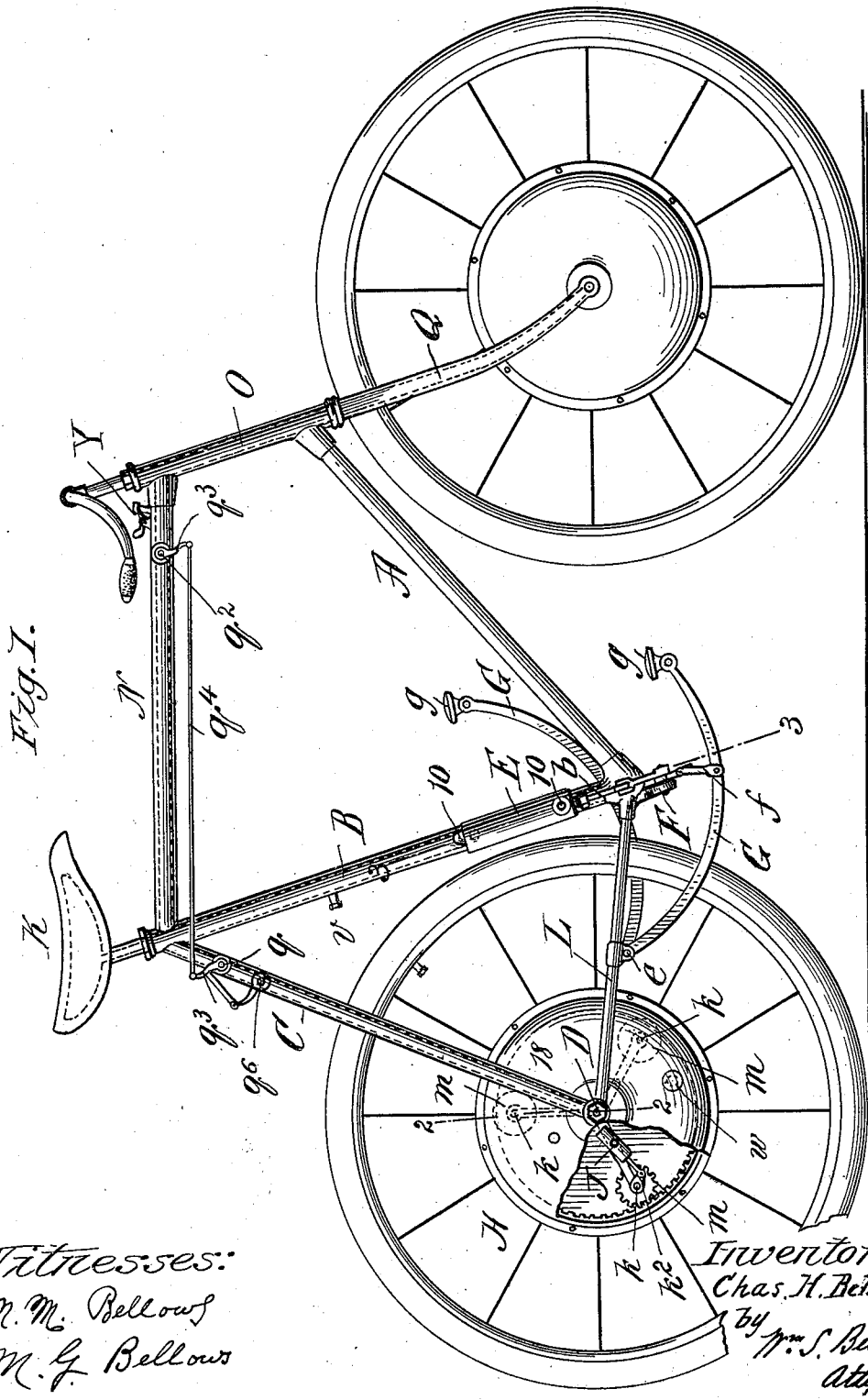
Fig. I.
Witnesses:
N. M. Bellows
M. G. Bellows
Inventor
Chas. H. Bellamy,
by Wm S. Bellows,
Atty.

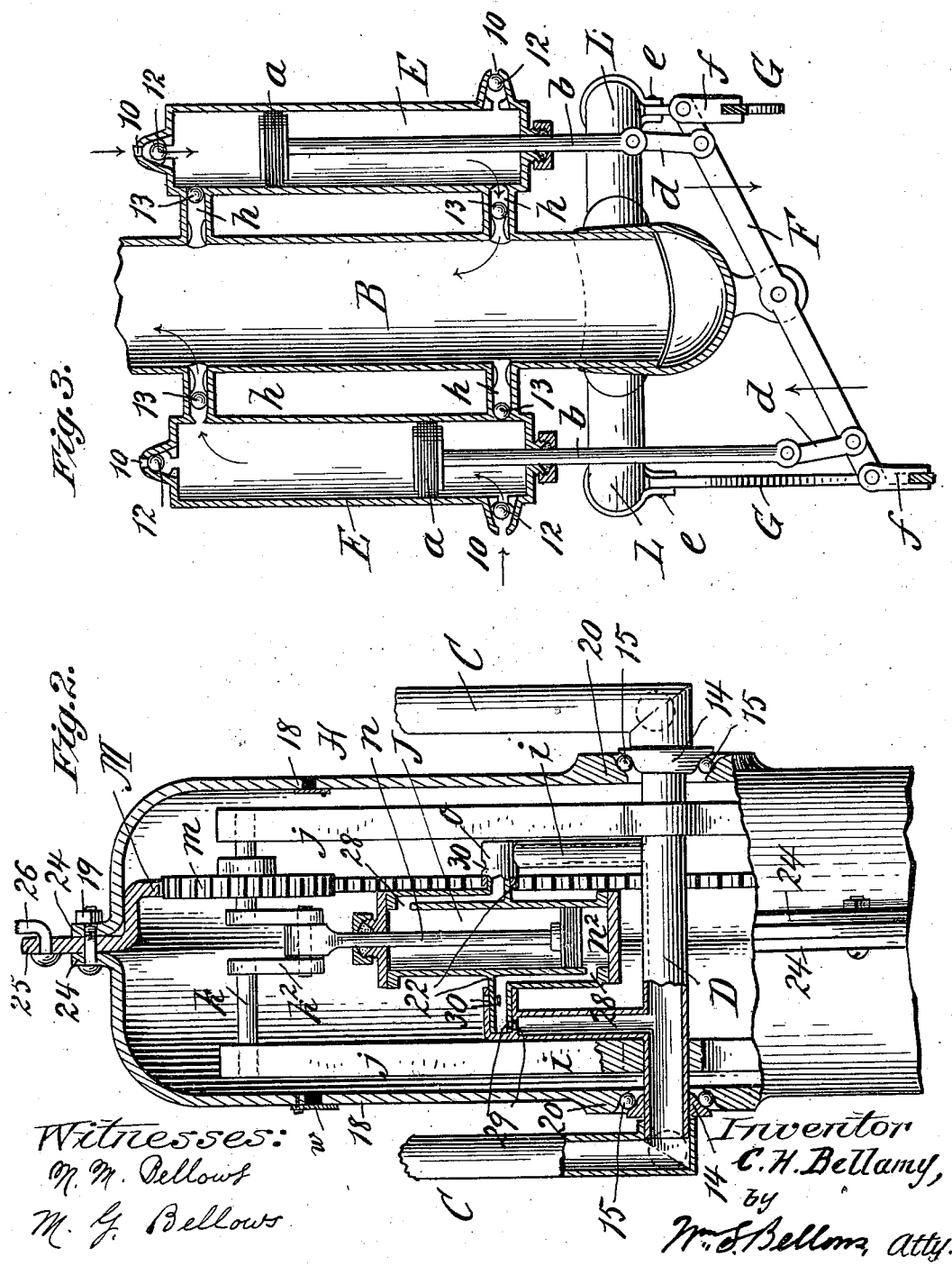

UNITED STATES PATENT OFFICE.

CHARLES H. BELLAMY, OF SOUTH HADLEY FALLS, MASSACHUSETTS.

BICYCLE.

SPECIFICATION forming part of Letters Patent No. 576,538, dated February 9, 1897.

Application filed February 4, 1896. Serial No. 578,005. (No model.)

*To all whom it may concern:*

Be it known that I, CHARLES H. BELLAMY, a subject of the Queen of Great Britain, and a resident of South Hadley Falls, in the county of Hampshire and State of Massachusetts, have invented certain new and useful Improvements in Bicycles and Analogous Vehicles, of which the following is a specification.

This invention relates to improvements in the means for propulsion of bicycles and other cycles and vehicles. The invention contemplates the compression of air manually by means therefor carried by the bicycle or vehicle and the utilization of the compressed air for operating the driving mechanism with which the machine is equipped.

An exemplification of the invention is illustrated in the accompanying drawings, in which—

Figure 1 is a side elevation, with parts broken out for clearer illustration, of a bicycle with the compressed-air propelling mechanism applied thereon. Fig. 2 is a vertical cross-sectional view on a large scale, taken on the line 2 2, Fig. 1. Fig. 3 is a substantially vertical cross-section, also on the larger scale, on line 3 3, Fig. 1.

Similar characters of reference indicate corresponding parts in all of the views.

I will now proceed to describe my equipments as shown, although I desire to here state that the invention is not limited to the precise constructions and arrangements illustrated, as there may be considerable variation therefrom without departing from the scope and spirit of the invention.

The bicycle has a frame A of the design and construction as ordinary, but it will be here pointed out that the upright frame member B is hollow and air-tight, being closed at the bottom, and the rear upper "forks" C C are also hollow, as is the rear wheel-axle D, with which the said hollow fork members are connected. The saddle K constitutes a reservoir for air, having connection with both the upright B and the said fork members C C. At or near the bottom of the frame and at opposite sides thereof are the duplicated pump-cylinders E E, having the pistons $a$ $a$ therein and the piston-rods $b$ $b$, which extend below the cylinders and by the links $d$ $d$ are connected with the intermediately pivotally supported lever F. The ends of this lever F are linked, as seen at $f$, (or they may be otherwise appropriately connected,) with intermediate portions of the longitudinally-ranging levers G G, the rear ends of which are pivotally hung at $e$ on the rear lower fork members L of the frame, while the forwardly-extending portions of these levers have pedals $g$ provided thereupon.

The air-pumps E E, as seen, are double-acting, having the upper and lower air-ingress ports 10 10, with check-valves 12 12 therefor, and also having the egress-passages $h$ $h$, connected with the aforesaid tubular upright B, and having the appropriately-arranged check-valves 13 13.

The hub or central portion H of the rear wheel is in the form of a circular casing, the opposite walls of which, about the axis, are circularly apertured and formed or equipped with members 20 of ball-bearings, between which and the cones 14 on the stationary axle D are the hardened balls 15.

The axle has formed thereon or secured thereto in opposing pairs the radial tubular posts $i$ $i$, with horizontal journals O O, in which are mounted the hollow trunnions 22 22 of the cylinders J J, three being a desirable number. The axle also has rigidly supported thereby radial arms $j$ $j$ adjacent said cylinders J, at the outer portions of which arms are journaled the crank-shafts $k$ $k$, on each of which is the fixed pinion $m$. The rods $n$ of the pistons $n^2$ in the cylinders connect with the cranks $k^2$, and all of the pinions $m$ are in mesh with the internal gear M, which is provided in and as a fixture of the said revoluble casing H. The said casing H, which constitutes the central portion of the driven wheel, and which freely turns on the fixed hollow axle, may be constructed as shown in Fig. 2, consisting of the opposing circular disk-shaped centrally-apertured and edged flanged parts 18 18, bolted together, as seen at 19, through the edge flanges 24. The internal gear M, in the form of a flanged annulus, has its outer flanged portion 25 clamped between the bolt-confined flange members 24 of said parts 18 18, and thus ample provision is made for the connections of the spoke 26, whereby a very stable and yet comparatively light wheel with central casing and internal gear is produced.

Each of the pumps supported for oscillation on the posts extending radially from the axle, as seen in the section through one thereof, Fig. 2, has ports 28 at opposite ends, between which the piston operates, whereby these motor-pumps, also, are double-acting, suitable registering ports for pressure and exhaust being provided, as indicated, 29 29 being the ports which may register for pressure, while 30 30 are the ports which at another instant may be in registry for the exhaust. Of course these are so arranged that there will be pressure in one end of the cylinder J while the air in the opposite end is freely exhausting.

The several cranks $k^2$ are of course set "at thirds" for the most effective operative action thereupon by the air-motors hung from the axle, and operated by pressure therethrough.

A cock is indicated at $q$ for cutting off the air-pressure which may drive the axle-supported motors.

The front wheel may be similarly equipped with mechanism and combined with air-motors mounted on a hollow front-wheel axle, with which connection may be had from the foot-actuated air-compressing pump E E by way of the hollow top bar N, the hollow head O, and the hollow front forks Q, all in suitable air connection the one with another, but this provision is deemed unnecessary. When adopted, however, a cock is also applied, as seen at $q^2$, for shutting off the air-pressure to the air-motors for the front wheel, and, as shown in Fig. 1, both of the cocks $q$ $q^2$ have on the stems thereof arms $q^3$, which are connected by a light rod $q^4$, the end thrust of which will open or close both cocks.

It will be observed with respect to the present improved cycle, cognizance being taken of the constructions and arrangements substantially as described, that an easy rational leg motion only is required to maintain the degree of air-pressure desired; that the effect of long levers G G is acquired, with corresponding power, and at the same time the alternating pumps are operated by said pedal mechanism, which as arranged allows for the narrow tread which is esteemed so desirable; that the pressure may be cut off from the driving wheel or wheels with the utmost ease; that in coasting or "running free" the feet and pedals are not moved, and that the nature of the driving mechanism or apparatus is such as to be little affected by dust, and is practically proof against being seriously affected by moisture.

By providing a nipple in the air-conduit between the air pump or pumps E and the cock which shuts off the pressure from the motors which operate the driven wheel it becomes practicable to connect with such nipple a tube which also couples onto the nipple of the pneumatic tire, whereby, by the reserve pressure or an intensified pressure as created by operating the pump-actuating mechanism, the inflation of the tire to the required degree may be acquired. Such a nipple is indicated at $v$ in Fig. 1. And in order that the motor-pumps within the closed casing H may freely exhaust at all times when the machine is running an outwardly-opening check-valve $w$ is provided. A simple hole would answer, but a check-valve is preferred to be also provided for the exclusion of dirt from within the casing.

At Y I have indicated a whistle or signaling-horn, having connection with one of the air-conduits. By properly opening this for the escape of the air therethrough a very decided and characteristic alarm may be sounded on occasion. An arrangement thereof near the handle-bar is a desirable one.

I claim—

1. In a bicycle or analogous vehicle, an air-compressing apparatus and means actuated by the rider for operating it, a hollow saddle which also serves as an air-reservoir connected with the compressor, and an air-motor applied for propelling one of the wheels of the vehicle having an air connection with said hollow saddle, substantially as described.

2. In a bicycle or analogous vehicle, a fixed hollow axle, a means for compressing air, and which is connected through the frame with the axle, and an internally-toothed wheel mounted on and revolving on the axle, combined with an oscillating motor mounted on and receiving its power for operating it through the axle, a cranked shaft operated by the motor, and a gear-wheel on said cranked shaft and which meshes with and operates the internally-toothed wheel, substantially as specified.

3. In a bicycle or analogous vehicle the combination with the opposing air-compressing pumps supported on the frame of the machine, of the longitudinally-ranging levers pivotally supported at their rear ends and having pedals, the transversely-arranged lever intermediately pivotally supported, connected with intermediate portions of said first-named levers and also having connection with the pistons of said pumps, an air-motor for propelling one of the wheels of the vehicle, having connection whereby to receive compressed air as primarily produced by said compressing-pumps, substantially as described.

4. In a vehicle of the character described the combination with the frame-upright B of the duplicated air-compressing pumps mounted at opposite sides of said upright and having the piston-rods thereof depending, the longitudinally-ranging, pedal-provided, levers G G rearwardly pivotally supported, the cross-lever F intermediately pivotally supported at the lower end of said upright, the links $d\ d$ connecting the cross-lever and said piston-rods, and the links $f\ f$ connecting said cross-lever with intermediate portions of the levers G, substantially as and for the purposes set forth.

In testimony that I claim the foregoing as my invention I have signed my name hereto in presence of two witnesses.

CHARLES H. BELLAMY.

Witnesses:
WM. S. BELLOWS,
J. W. NOURBOURN.